United States Patent [19]
Wirch
[11] 3,949,465
[45] Apr. 13, 1976

[54] METHOD OF BRACING STUDS IN FRAMED WALL SECTIONS

[76] Inventor: Charles E. Wirch, 1366 E. Palm, Altadena, Calif. 91001

[22] Filed: Apr. 18, 1974

[21] Appl. No.: 461,958

Related U.S. Application Data

[60] Continuation-in-part of Ser. No. 376,819, July 5, 1973, Pat. No. 3,851,372, which is a division of Ser. No. 199,959, Nov. 18, 1971, Pat. No. 3,744,540.

[52] U.S. Cl. ........... 29/432; 144/309 R; 144/314 R; 144/323; 144/326 R

[51] Int. Cl.² .......... B23P 11/00

[58] Field of Search .......... 29/432, 457; 52/633; 144/309 R, 314 R, 321, 323, 326 R

[56] References Cited

UNITED STATES PATENTS

| | | | |
|---|---|---|---|
| 3,496,693 | 2/1970 | Troutner | 29/432 X |
| 3,657,796 | 4/1972 | Gochnauer | 29/432 |

*Primary Examiner*—Willie G. Abercrombie
*Assistant Examiner*—W. D. Bray
*Attorney, Agent, or Firm*—Christie, Parker & Hale

[57] ABSTRACT

Diagonal bracing of a framed wall panel section is provided by a metal brace of U-shaped channel configuration extending diagonally from a top plate of the wall section across a series of studs to the bottom plate of the wall section. Opposed flanges of the brace are fitted into diagonally aligned saw cuts extending into the depth of the top and bottom plates and studs. In a preferred method of making the wall section, an elongated saw guide track is temporarily fastened diagonally across the faces of the studs and the plates. A double-bladed hand saw is run along the length of the saw guide track to form the diagonal saw cuts in the studs and plates. A double-bladed hand saw is run along the length of the saw guide track to form the diagonal saw cuts in the studs and plates. The saw guide is removed, and the flanges of the channel-shaped brace are then fitted into the saw cuts. The brace is then nailed to the plates and the studs.

17 Claims, 9 Drawing Figures

Fig. 2
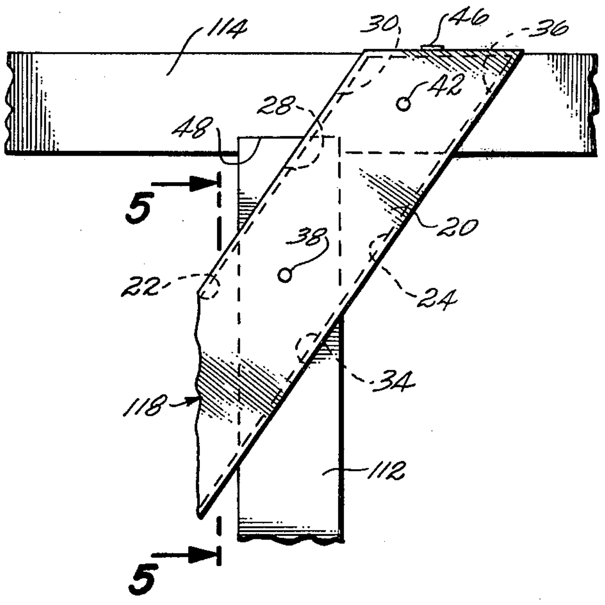
Fig. 3
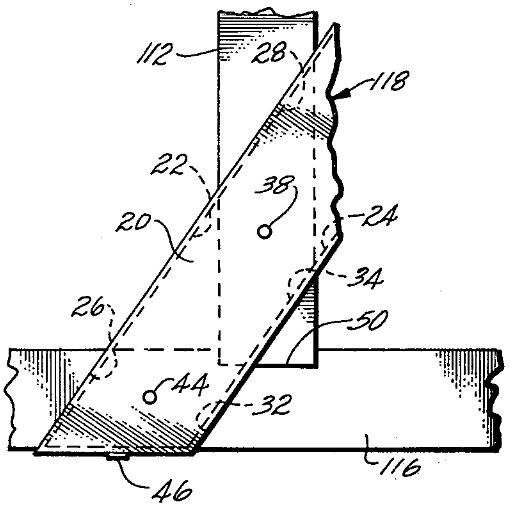
Fig. 5
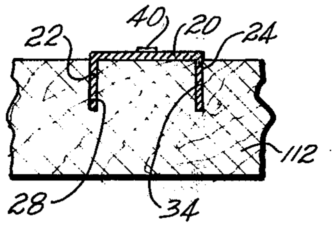
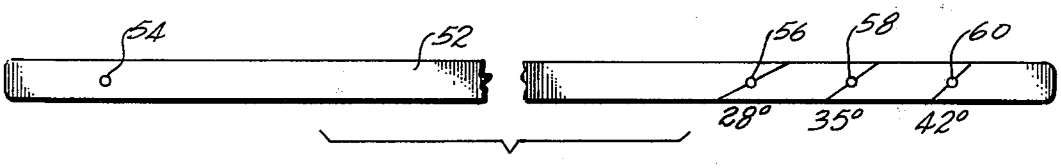
Fig. 4

METHOD OF BRACING STUDS IN FRAMED WALL SECTIONS

CROSS-REFERENCE TO RELATED APPLICATIONS

This is a continuation-in-part of application Ser. No. 376,819, filed July 5, 1973, now U.S. Pat. No. 3,851,372 which, in turn, is a division of Ser. No. 199,959, filed Nov. 18, 1971, now U.S. Pat. No. 3,744,540.

BACKGROUND

This invention relates to diagonal bracing of framed wall panels and to a method of making such wall panels.

Building codes generally require diagonal bracing to rigidly brace the studs in framed wall panels. Wall panels constructed without adequate diagonal bracing tend to sway under heavy horizontal stress such as that occurring during earthquakes.

One prior art bracing technique is to cut separate wood blocks with angled ends and then fit the block diagonally between adjacent pairs of studs. This method requires time consuming mitering of the blocks to accurately form the angled end surfaces. Moreover, this method requires on-site toe-nailing of the blocks between the studs. Toe-nailing also is time consuming, and generally is done by skilled workmen who must be experienced in properly aligning the blocks on a common diagonal axis during nailing.

A second prior art bracing technique is to cut a series of notches in the front surface of a wooden brace, and then mount the brace diagonally across the studs so the studs fit into corresponding notches in the brace. After the diagonal brace is in place, the brace is toe-nailed to the studs. This technique also is time consuming and costly because of the mitering required to accurately fit the notched brace around the series of studs, and the on-site toe-nailing of the brace to the studs.

Because of the disadvantages in the two above-mentioned bracing techniques, framed wall panels today are commonly braced by a technique in which the face of each stud and the top and bottom plates are sawed and chiseled out by hand to form diagonally aligned recesses for receiving a diagonal brace member. The steps generally followed in constructing a framed wall panel using this method of bracing are as follows. (1) The top and bottom plates are measured and marked at 16 inch centers. (2) The studs are nailed to the top and bottom plates. (3) The ends of a 1-inch-by-6-inch wooden brace are saw cut at angles so the ends of the brace will be flush with the plane of the top and bottom plates when the brace is finally attached to the wall panel section. (4) The brace is placed diagonally across the face of the studs from the top plate to the bottom plate, and then temporarily tacked in place. (5) A hand saw is run along the opposite edges of the brace from the top plate to the bottom plate to make a ¾-inch cut in the studs and plates at each side of the brace. (6) The brace is removed. (7) The area between the two saw cuts is then chiseled out by hand to form diagonally aligned recesses for receiving the brace. (8) The brace is then fitted into the recesses and temporarily tacked in place. (9) The wall frame section is raised and placed in its desired position, after which it is squared, plumbed, and then held in place by nailing a second plate above the top plate. (10) The brace is then nailed to each stud and the top and bottom plates. Building codes generally require that two nails be used at each nailing location.

This prior art bracing method is time consuming and costly. It requires above five times as much time as the bracing method of the present invention, and is often a two-man job.

Moreover, the bracing provided by the prior art method is not as structurally sound as that provided by the present invention, especially because the step of chiseling out the recesses by hand is often done inaccurately and incompletely, and as a result, the only structural connection between the brace and the studs is provided by the nails.

SUMMARY

This invention provides a bracing system and method which overcomes the disadvantages of the prior art methods described above.

Briefly, the bracing system includes a rigid brace member extending diagonally across the face of a series of studs in a typical framed wall section. The brace member has a base portion overlying the front face of the studs, and at least one flange integral with the base portion and fitted into separate collinear and diagonally extending saw cuts extending into the depth of the studs. Fastening means extend through the bracing member and into the studs to hold the brace member in a rigid position on the wall panel.

In a preferred form of the invention, the brace member is of U-shaped channel configuration and is preferably made of metal. The brace member has a pair of opposed flanges which are fitted into two series of parallel, diagonally aligned saw cuts extending across the face of the studs.

The wall panel section is formed by initially placing an elongated saw guide track diagonally across the face of the studs from the top plate to the bottom plate. A saw is then run along the saw guide to form diagonally aligned saw cuts extending into the depth of the studs. The saw guide is removed, and a rigid brace member is then placed into the saw cuts and against the front faces of the studs. The brace is fastened to the studs.

Preferably, the top and bottom plates are premortised by forming notches which receive the top and bottom ends of the studs. This automatically squares the wall panel section prior to forming the saw cuts for receiving the brace member.

Thus, the present invention provides a substantial savings of construction time when compared with the common techniques now used for bracing framed wall panels. The method of this invention reduces sawing time, no chiseling of the studs or plates is required, nailing is reduced substantially, and squaring and plumbing time are eliminated.

These and other aspects of the invention will be more fully understood by referring to the following detailed description and the accompanying drawings.

DRAWINGS

Figures 1A, 1B, 1C:
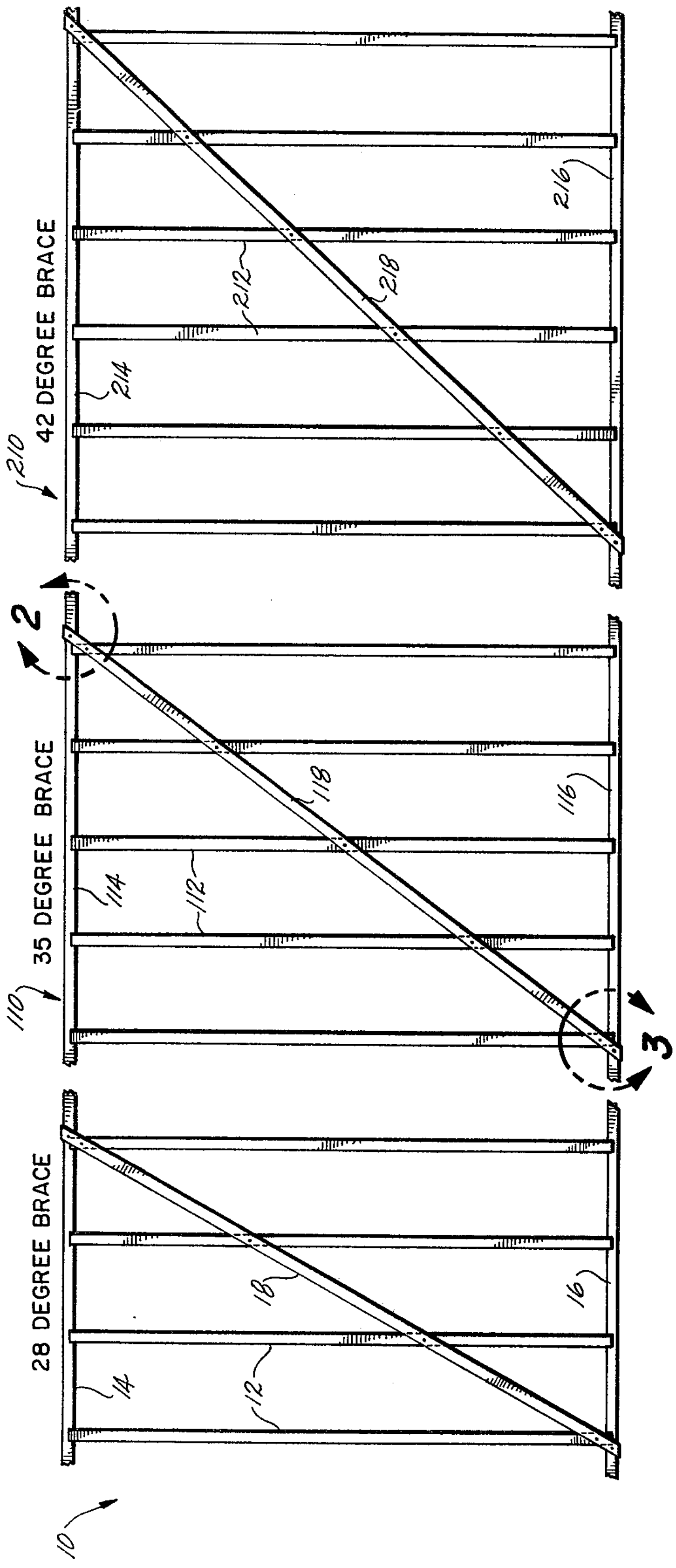

FIGS. 1A, 1B, and 1C are fragmentary front elevation views showing the bracing techniques of this invention used in different types of bracing construction;

FIG. 2 is an enlarged fragmentary front elevation view of the bracing assembly shown within the circle 2 of FIG. 1B;

FIG. 3 is an enlarged fragmentary front elevation view showing the bracing assembly within the circle 3 of FIG. 1B;

Figure 6:
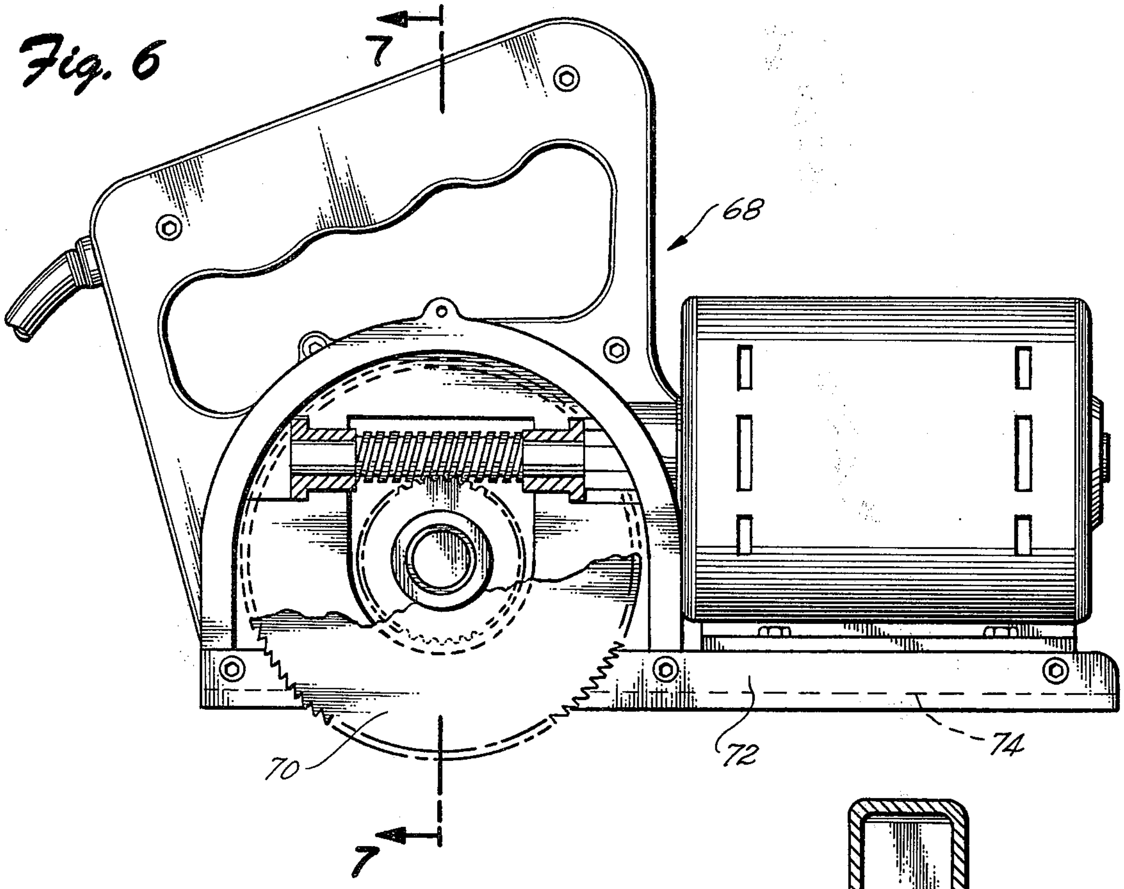
Figure 7:
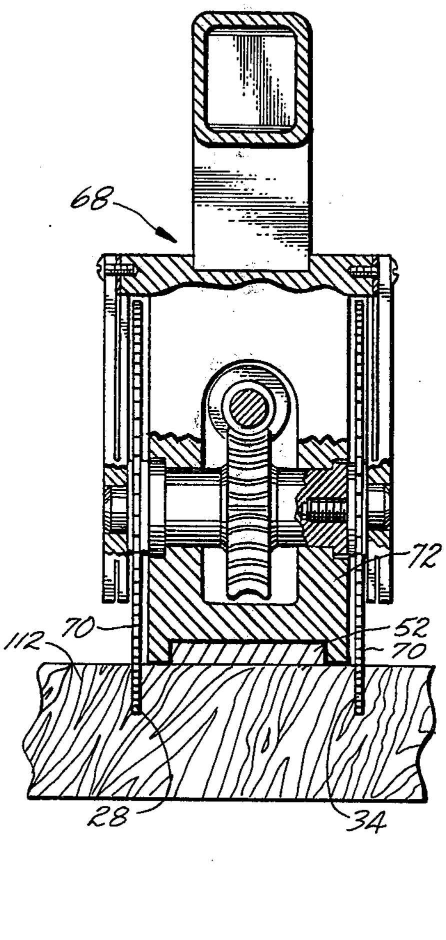

FIG. 4 is a fragmentary top plan view showing a saw guide for use in carrying out the method of this invention;

FIG. 5 is a fragmentary cross-sectional elevation view taken on line 5—5 of FIG. 2;

FIG. 6 is a fragmentary side elevation view showing a double-bladed, power-driven hand saw for use in carrying out the method of this invention; and FIG. 7 is a fragmentary cross-sectional elevation view, partly broken away, taken on line 7—7 of FIG. 6 and showing the hand saw in use carrying out the method of this invention.

DESCRIPTION

Referring to FIG. 1A, a framed wall panel section 10 includes a series of horizontally spaced apart and substantially parallel studs 12 extending vertically between a horizontal top plate 14 and a bottom plate or sill plate 16 spaced below and extending parallel to the top plate. The studs 12 are braced by a diagonal elongated metal bracing member 18 extending across the face of the studs from the top plate to the bottom plate. The bracing member 18 of the wall section 10 forms a 28° brace, which refers to the approximate angle formed by the brace when providing bracing for a wall panel section having a series of four studs 12. Similarly, FIG. 1B shows a metal bracing member 118 according to this invention for providing a 35° brace for a wall section 110 containing five studs 112. FIG. 1C shows a further bracing member 218 for providing a 42° brace for a wall panel section 210 having six studs 212.

The structure of the brace members 18, 118, and 218 will be understood best by referring to FIGS. 2, 3, and 5. The metal bracing member preferably is of U-shaped channel configuration and includes a flat base portion 20 and a pair of opposed elongated flanges 22 and 24 integral with the opposite sides of the base portion 20. The flanges 22 and 24 are fitted into two series of parallel, diagonally aligned saw cuts extending across the face of the bottom plate 116, the studs 112, and the top plate 114. The flange 22 is fitted into a diagonal saw cut 26 formed in the bottom plate 116, a series of diagonally aligned saw cuts 28 extending into the depth of the studs 112, and a diagonal saw cut 30 formed in the top plate 114 and aligned diagonally with the saw cut 26 and the saw cuts 28. Similarly, the flange 24 is fitted into a diagonal saw cut 32 in the bottom plate 116, a series of spaced apart diagonally extending saw cuts 34 extending into the depth of the studs 112, and a diagonal saw cut 36 extending across the face of the top plate 114 and aligned diagonally with the saw cut 32 and the saw cuts 34. As shown best in FIG. 5, the flanges 22 and 24 makes a snug fit in their corresponding saw cuts 28 and 34 such that the base portion 20 of the bracing member lies firmly against the front face of the studs 112 and the top and bottom plates 114 and 116.

The brace 118 is provided with a series of spaced apart and diagonally aligned holes 38 through which fasteners, such as nails 40, can be driven to fasten the bracing member to the studs. The bracing member also includes a top hole 42 through which a nail (not shown) can be driven to attach the top of the bracing member to the top plate 114, and a bottom hole 44 for receiving a nail (not shown) for attaching the bottom of the brace to the bottom plate 116. As shown best in FIG. 5, the holes are aligned on the bracing members so that holes 38 are on the approximate centerline of the studs 112, while holes 42 and 44 lie on the approximate centerline of the top and bottom plates, respectively.

FIGS. 2 and 3 show that the ends of the bracing member are folded over the top and bottom edges of the top and bottom plates, respectively, and that the folded over portions are fastened to the plates by nails 46. These folded portions can be bent initially when the bracing member is fabricated in the factory, or the end portions of the bracing member can be provided with linear creases (not shown) which can later facilitate bending the ends of the bracing member after it is attached to the wall section. Moreover, FIG. 2 shows a single top plate 114 over which the end of the bracing member is folded. However, this is only one bracing arrangement which may be used. As an alternative, the bracing member 118 may extend over a second top plate (not shown) overlying the top edge of the top plate 114, with the top end of the bracing member then being folded over the top edge of the second top plate.

In the preferred method of bracing the wall panel sections, the top plate 114 is initially premortised to form a series of longitudinally spaced apart notches 48 extending continuously across the bottom edge of the top plate 114. The bottom plate 116 also is premortised to form a series of longitudinally spaced apart continuous notches 50 across the top edge of the bottom plate 116. The framed wall panel is then assembled by placing the top and bottom ends of the studs 112 in the top and bottom notches 48 and 50, as shown in FIGS. 1A through 1C. Preferably, the top and bottom plates are premortised by the multi-mortising machine disclosed in my U.S. Pat. No. 3,744,540, which issued on the parent of the present application. The use of the multi-mortising machine provides mortised top and bottom plates with accurately aligned premortised notches, so that when the studs 112 are later inserted in the notches, they cooperate with the top and bottom plates to form a completely square framed wall panel section. This will later eliminate the need for squaring and plumbing the wall section, which is a step commonly required in conventional wall frame construction.

After the studs are nailed to the mortised top and bottom plates, an elongated saw guide track 52, shown in FIG. 4 is extended across the face of the studs at the required bracing angle and tacked at its ends to the top and bottom plates. The saw guide track includes a bottom hole 54 spaced about 10 inches in from one end of the guide track to facilitate tacking the lower end of the guide to the approximate centerline of the first, or left (as viewed in FIG. 1) stud of the wall panel section to be braced. The opposite end of the saw guide includes a series of spaced apart holes 56, 58 and 60 to facilitate tacking the upper end of the saw guide to the approximate centerline of the fourth, fifth, or sixth stud of the wall panel section, depending upon the angle of bracing desired. The holes 56, 58 and 60 are respectively used when 28°, 35° and 42° bracing is being formed. The holes 56, 58, and 60 also can be indexed as shown in FIG. 4 to quickly indicate the corresponding bracing angles. Preferably, the lower portion of the saw guide track is initially tacked in its desired position at the bottom of the first stud, and then the top of the saw guide is then swung into its desired diagonal orientation, after which the upper portion of the saw guide is tacked to the stud which provides the appropriate bracing angle.

Once the saw guide track is in place across the face of the studs, a double-bladed, power driven hand saw 68, shown in FIGS. 6 and 7, is run lengthwise along the saw guide track to form spaced apart saw cuts along opposite sides of the guide track for receiving the flanges of the bracing member. The hand saw includes a pair of downwardly projecting and spaced apart rotary saw blades 70 located on opposite sides of a guide shoe 72 affixed to the bottom of the saw. An elongated guide channel 74 is formed in the bottom edge of the guide shoe 72. The guide channel 74 conforms to the configuration of the saw guide track 52 so that the hand saw can be mounted over the saw guide track, as shown in FIG. 7, and then run lengthwise along the saw guide to form the linear saw cuts 28 and 34 along the edges of the saw guide. Preferably, the guide shoe and saw blades are arranged relative to each other so that saw cuts ½ inch deep are formed two inches apart in the studs and the plates. The saw cuts preferably are about 1/16 inch wide.

After the saw cuts are made, the saw guide is removed and the flanges of the metal brace are inserted in their corresponding saw cuts so that the flanges make a snug fit in the saw cuts. The brace is then nailed to the top plate, the bottom plate, and each stud. Only one nail is required at each point of attachment. The wall frame is then ready to be raised into position, and needs no further squaring, since it is already squared and rigid.

The method of this invention requires about five times less time to assemble a typical framed wall panel section than conventional bracing in which recesses are chiseled out by hand in the plates and studs. Sawing time is substantially reduced, no chiseling time is required, and only half the amount of nailing is required. Thus, a substantial savings of man-hours required to assemble and position the framed wall sections is provided. Moreover, a more structurally sound braced wall section is provided, because the accurately fitting metal braces are offered lateral support by the studs and the plates, which is not the case in the usual conventional method of bracing, in which inaccurately formed chiseled recesses do not contribute much to the structural integrity of the wall section.

I claim:

1. A method of making a rigid building wall panel of framed construction comprising the steps of:

attaching a series of spaced apart and substantially parallel studs between a top plate and a bottom plate to form a framed wall panel in which the top plate, bottom plate, and studs each have a front face lying in the plane of the wall panel and a depth extending perpendicular to the plane of the wall panel, placing an elongated saw guide diagonally across the face of the studs, running a saw along the saw guide to form a series of diagonally aligned saw cuts extending into the depth of the studs, removing the saw guide from the studs, placing a rigid brace member into the saw cuts and against the front faces of the studs, and fastening the brace member in a fixed position relative to the studs to hold the bracing member in a rigid position on the wall panel.

2. The method according to claim 1 in which the bracing member has a base portion and a flanged portion integral with the base portion, and including the steps of fitting the flanged portion of the bracing member into the separate diagonally aligned saw cuts extending into the depth of each stud so the base portion of the bracing member overlies the front faces of the studs.

3. The method according to claim 1 in which the bracing member is of U-shaped channel configuration and includes an elongated base portion and opposed marginal flanges integral with the base portion, and including the steps of forming two series of collinear, diagonally aligned saw cuts across the face of the studs and into the depth of the studs, and fitting the flanges of the bracing member into the two series of diagonally aligned saw cuts so that the base portion of the bracing member overlies the front faces of the studs.

4. The method according to claim 3 including the step of forming the two series of saw cuts by a double-bladed saw by straddling the opposite edges of the saw guide with the blades of the saw, and running the saw lengthwise along the saw guide to simultaneously form the two series of diagonally aligned saw cuts.

5. The method according to claim 2 including extending the fastening means through the base portion of the bracing member and into the depth of each stud.

6. The method according to claim 2 in which the top plate and the bottom plate include respective sets of spaced apart notches in which the notches in one plate are aligned with corresponding notches in the other plate and extend into the depth of the plates; and including the steps of disposing the tops of the studs in separate notches formed in the top plate, and disposing the bottoms of the studs in separate notches formed in the bottom plate so the studs extend generally parallel to each other between the top and bottom plates.

7. The method according to claim 6 including the steps of disposing the base portion of the bracing member over the front face of the top and bottom plates, disposing the flange into diagonal saw cuts in the top and bottom plates, and extending the fastening means through the bracing member and into the top and bottom plates.

8. The method according to claim 3 in which the top plate and bottom plate include respective sets of spaced apart notches in which the notches in one plate are aligned with corresponding notches in the other plate and extend into the depth of the plates; and including the steps of disposing the tops of the studs in separate notches formed in the top plate, and disposing the bottoms of the studs in separate notches formed in the bottom plate so the studs extend generally parallel to each other between the top and bottom plates.

9. The method according to claim 8 including the steps of disposing the base portion of the bracing member over the front face of the top and bottom plates, disposing the flange into diagonal saw cuts in the top and bottom plates, and extending the fastening means through the bracing member and into the top and bottom plates.

10. A method of bracing a building wall panel of framed construction which includes a series of spaced apart and substantially parallel studs extendings between a top plate and a bottom plate, and in which the top plate, bottom plate, and studs each have a front face lying in a plane of the wall panel and a depth extending perpendicular to the plane of the wall panel, the method comprising the steps of:

running a saw across the face of the studs to form two series of collinear saw cuts extending parallel to one another diagonally across the face of the studs and into the depth of the studs, placing a rigid bracing member of generally U-shaped channel configuration into the saw cuts, the bracing member having an elongated base portion and opposed marginal flanges integral with the base portion, the opposed flanges of the bracing member being fitted into the two series of diagonally extending saw cuts so the base portion of the bracing member overlies the front faces of the studs, and fastening the bracing member in a fixed position relative to the studs to hold the bracing member in a rigid position on the wall panel.

11. The method according to claim 10 including placing an elongated saw guide diagonally across the face of the studs, and running a saw along each edge of the saw guide to form the two series of collinear, diagonally extending saw cuts, and thereafter removing the saw guide from the studs prior to placing the bracing member into the saw cuts.

12. The method according to claim 10 including separate sets of spaced apart notches formed in the top plate and the bottom plate in which notches in one plate are aligned with corresponding notches in the other plate and extend into the depth of the plates; and including the steps of disposing the tops of the studs in the notches formed in the top plate, and disposing the bottoms of the studs in the notches formed in the bottom plate so the studs extend generally parallel to each other between the top and bottom plates; and thereafter forming the saw cuts in the studs, and placing the brace member into the saw cuts.

13. The method according to claim 11 including separate sets of spaced apart notches formed in the top plate and the bottom plate in which the notches in one plate are aligned with corresponding notches in the other plate and extend into the depth of the plates; and including the steps of disposing the tops of the studs in the notches formed in the top plate, and disposing the bottoms of the studs in the notches formed in the bottom plate so the studs extend generally parallel to one another between the top and bottom plates; and thereafter placing the saw guide across the studs, running the saw along the saw guide to form the saw cuts, removing the saw guide, and placing the brace member into the saw cuts.

14. In a method of bracing a building wall panel of framed construction in which the panel includes a series of spaced apart and substantially parallel studs extending between a top plate and a bottom plate, and in which the top plate, bottom plate, and studs each have a front face lying in the plane of the wall panel and a depth extending perpendicular to the plane of the wall panel, the method comprising the steps of:

forming a series of spaced apart notches in the top plate and the bottom plate, the notches being spaced equidistantly apart and extending into the depth of the plates, disposing the tops of the studs in separate spaced apart notches formed in the top plate, and disposing the bottoms of the studs in separate spaced apart notches formed in the bottom plate to align the studs so they extend generally parallel to one another between the top and bottom plates, running a saw across the face of the studs to form a series of collinear, diagonally extending saw cuts extending into the depths of the studs, placing a rigid brace member into the saw cuts and against the front faces of the studs, and fastening the brace member in a fixed position relative to the studs to hold the bracing member in a rigid position on the wall panel.

15. The method according to claim 14 in which the bracing member is of U-shaped channel configuration and includes an elongated base portion with opposed marginal flanges integral with the base portion; and including the steps of running the saw across the face of the studs to form two series of said collinear, diagonally extending saw cuts spaced apart by the distance equal to the distance between tnhe flanges of the bracing member, and including disposing the flanges of the bracing member into the two series of diagonally aligned saw cuts so the base portion of the bracing member overlies the faces of the studs.

16. The method according to claim 15 including placing an elongated saw guide diagonally across the face of the studs, thereafter running the saw along the saw guide to form the two series of collinear, diagonally extending saw cuts, thereafter removing the saw guide from the studs, and thereafter placing the rigid brace member into the saw cuts.

17. The method according to claim 14 including placing an elongated saw guide diagonally across the face of the studs, thereafter running a saw along the saw guide to form the saw cuts extending into the depth of the studs, thereafter removing the saw guide from the studs, and thereafter placing the rigid brace member into the saw cuts.

* * * * *